United States Patent

Carr

[11] 3,966,223
[45] June 29, 1976

[54] VEHICLE SUSPENSION

[76] Inventor: James P. Carr, 15005 Lear Lane, Silver Spring, Md. 20904

[22] Filed: Nov. 8, 1974

[21] Appl. No.: 522,165

[52] U.S. Cl................................. 280/712; 267/18
[51] Int. Cl.².......................................... B60G 11/46
[58] Field of Search.............. 280/124 F; 267/18, 34

[56] References Cited
UNITED STATES PATENTS

| | | | |
|---|---|---|---|
| 3,050,316 | 8/1962 | Behles | 280/124 F X |
| 3,782,753 | 1/1974 | Sweet | 280/124 F |

*Primary Examiner*—Philip Goodman
*Attorney, Agent, or Firm*—Peter A. Taucher; John E. McRae; Nathan Edelberg

[57] ABSTRACT

The invention can take the form of different suspension systems which provide essentially constant force (zero spring rate) individual wheel support of a vehicle during normal individual wheel travel. Zero spring rate is achieved by supplying essentially constant air pressure to air bag suspension elements. In one system regulation of suspension height and air pressure is achieved by open bottom air bags utilizing the ground effects principle. A second system utilizes closed air bags operating against opposing governing springs. Constant air pressure is supplied from a controlled reservoir. Auxiliary force mechanisms are provided for total system support during high vertical, longitudinal and angular vehicle accelerations.

10 Claims, 8 Drawing Figures

VEHICLE SUSPENSION

BACKGROUND AND SUMMARY OF THE INVENTION

To attain high cross country speed a suspension is required that enables a vehicle to follow the general contour of the terrain but allows the vehicle to traverse discrete obstacles such as bumps, rocks, logs, etc., without any disturbing effect on the vehicle. Ideally, this requires that the movement of individual suspension units do not increase or decrease the support force on the vehicle, i.e., a constant force (zero rate) suspension system. It is also required that the system ride characteristics insofar as possible remain the same with and without payload, and possess low natural frequency for soft ride and low vehicle maintenance. These latter conditions are met with conventional air bag springs. Thirdly, the suspension system as a whole must have a variable high rate suspension characteristic to enable the vehicle to follow the general contour of the terrain while possessing high lateral and longitudinal stability. The stability is required to meet high pitch, vertical and roll accelerations encountered in panic braking, cornering and traversing cross country terrain macro obstacles.

AIR BAG, ZERO RATE, OPPOSING GOVERNING SPRING SYSTEM:

This system uses conventional air bags manifolded together on each side of the vehicle. Typical system detail at one wheel is shown in FIGS. 1 and 2. Manifolds on each side of the vehicle are connected to a constant pressure reservoir. Each wheel suspension normally operates against an opposing governing spring. Each individual wheel unit is also equipped with either a max position air pressure shut-off valve or a max stop spring for high loading conditions. Suspension static position will be with air bags largely extended. Wheel travel will be essentially all jounce with very little rebound travel. As obstacles are encountered the wheel is lifted off the governing spring and the vehicle experiences a net lifting force increase equal to the governing spring preload. Once off the governing spring, the wheel becomes supported solely by the air bag suspension. As upward movement of the wheel continues, the suspension force remains constant due to the constant air pressure reservoir. As the upward travel limit is approached, a max load spring or air bag pressure shut-off valve is engaged for high load/travel conditions. This system requires only a small amount of intermittent air supply to replenish any air dumped by the reservoir to maintain constant pressure. If desired, reservoir pressure distribution from side to side and with pitch can be controlled by valving systems for lateral and longitudinal stability for side slope operation, cornering and braking stability.

GROUND EFFECTS TYPE, ZERO RATE, AIR BAG SUSPENSION SYSTEM:

The system uses continual air supply at uniform air pressure to individual air bag suspension units which are open at the bottom with self regulating daylight clearance, as in Ground Effects Machine (GEM) skirts. Typical system is shown in FIG. 3. Pressure and force is essentially constant throughout travel. High load/travel springs are provided for peak load/travel conditions. Bump stops are provided for max travel limit when wheels are not in contact with the ground, i.e., when traversing ditches and holes. Suspension has jounce action only. There is no rebound travel. Suspension static position is with air bags fully extended. When a bump or obstacle is encountered the wheel will move upward, and the daylight clearance will close, immediately decreasing air flow and raising the bag pressure a small amount. Pressure rise magnitude is dependent on supply fan/pump characteristics. Pressure and force will remain constant with further upward travel until high load/travel spring is encountered. The continual air supply required for this system would be much less than that needed for lift on a GEM vehicle because the geometry affecting daylight clearance, pressure loss and airflow are controlled by machined surfaces. On GEM vehicles, air flow requirements are affected by terrain surface which is unpredictable, constantly varying, and daylight parameter and area are large. A supply control valve can be incorporated to limit loss of air when suspension is not in contact with the ground. Alternatively, max daylight clearance and loss of air can be limited by utilizing a sharp edge labyrinth structure or controlled orifice.

THE DRAWINGS

Figure 3:
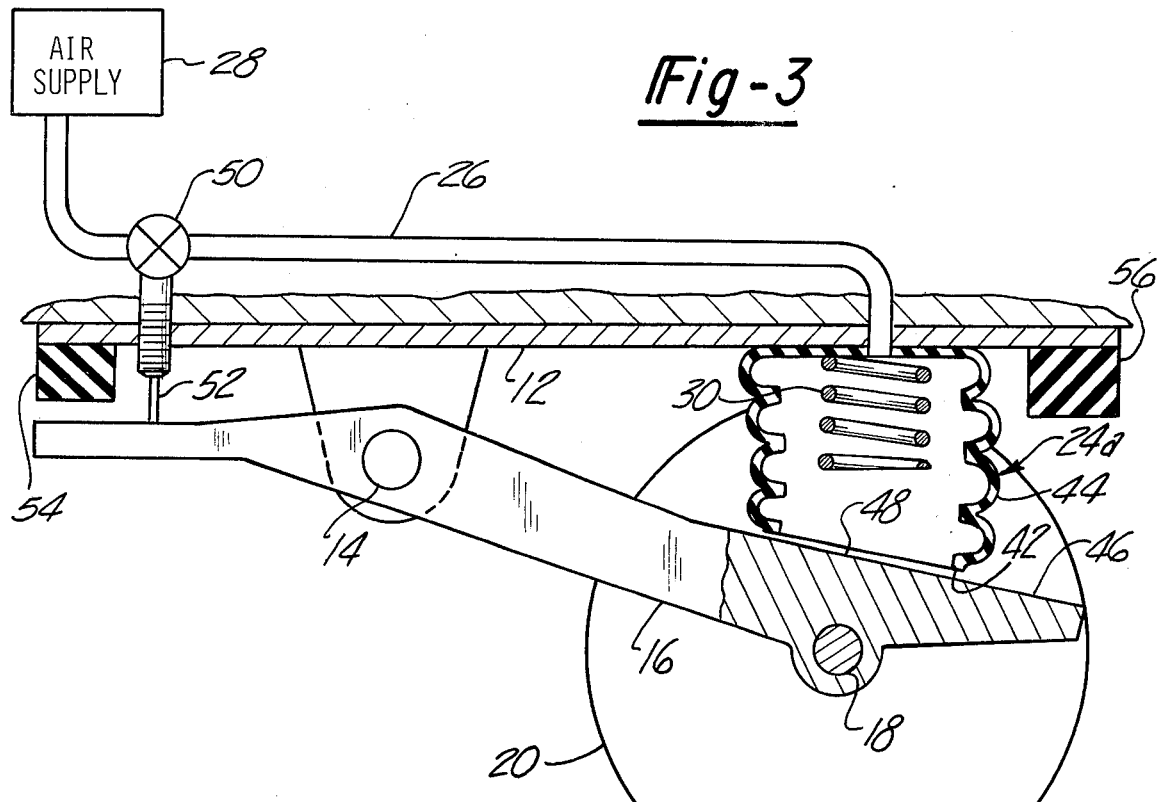
FIGS. 3 and 4 are side elevational views of a GEM type suspension system incorporating the invention.
Figure 4:
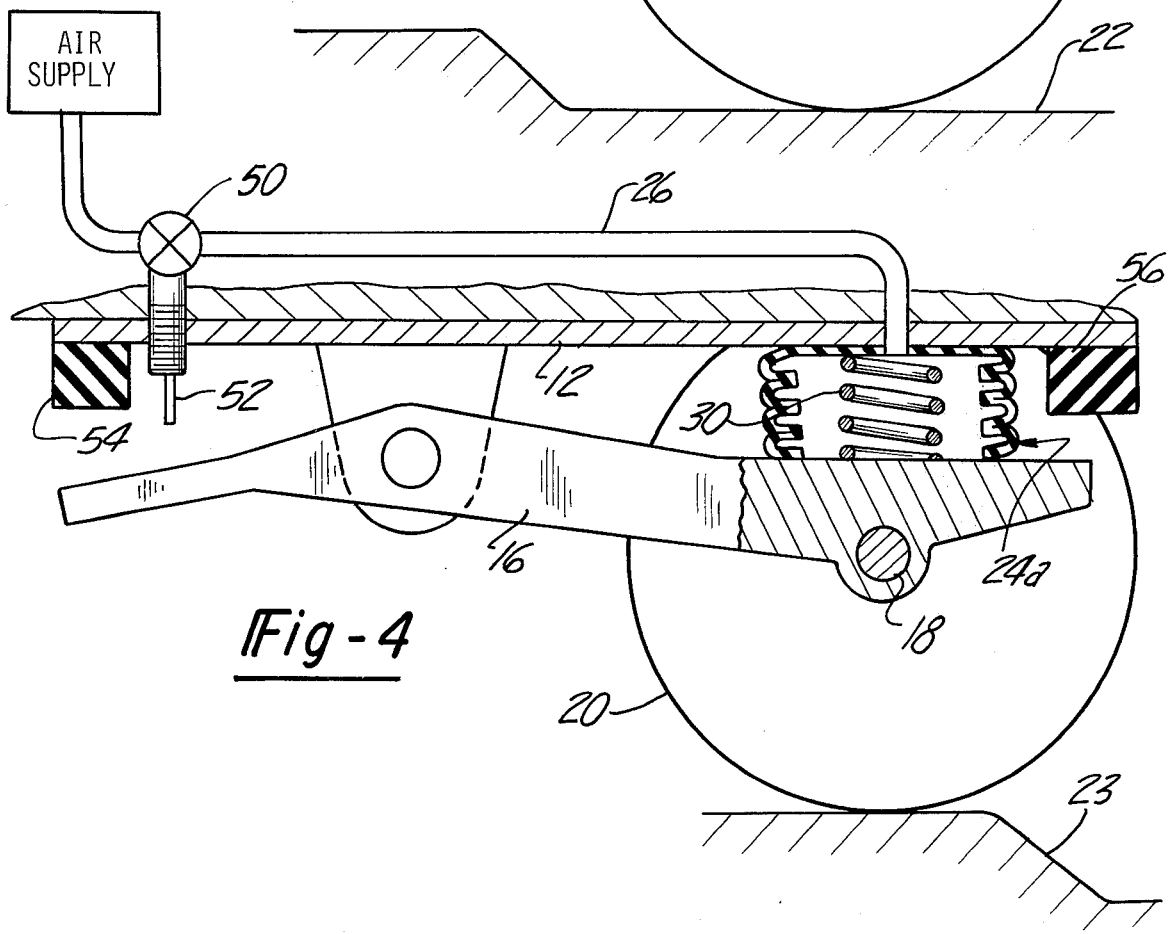
Figure 5:
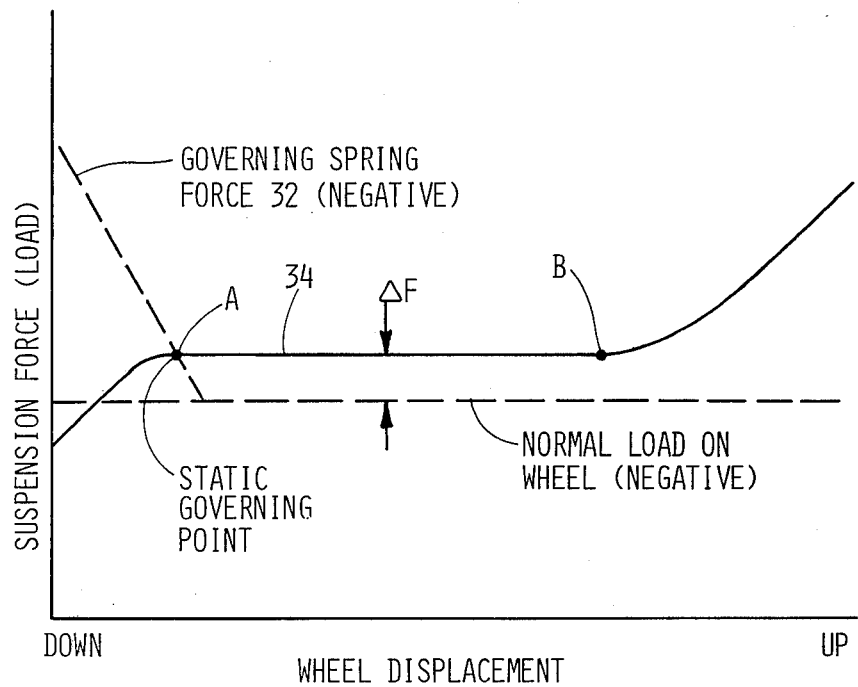
Figure 6:
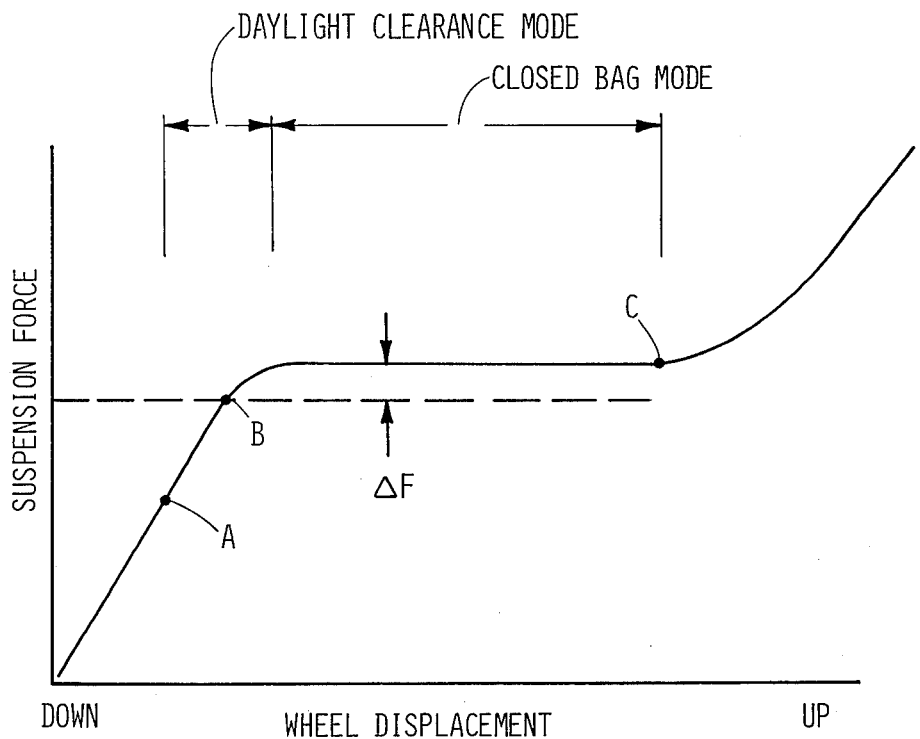

FIGS. 5 and 6 graphically show wheel travel versus applied load for the suspension systems shown in FIGS. 1 through 4.

Figure 7:
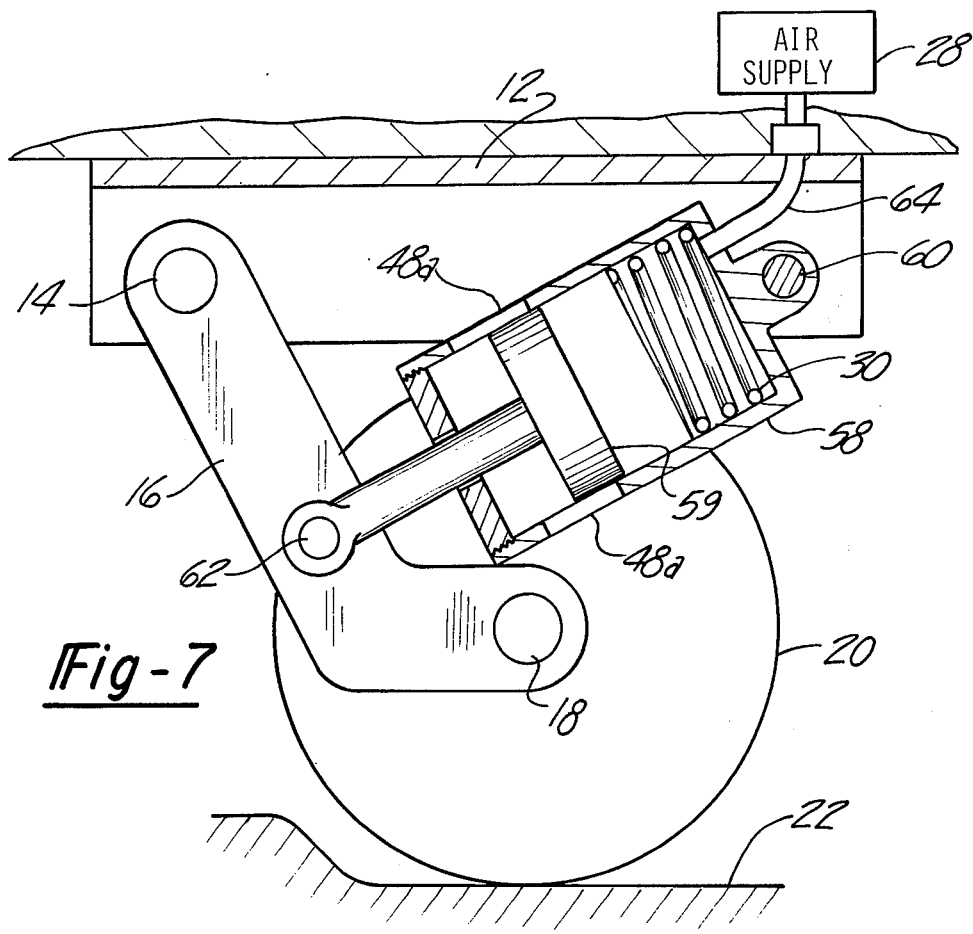
Figure 8:
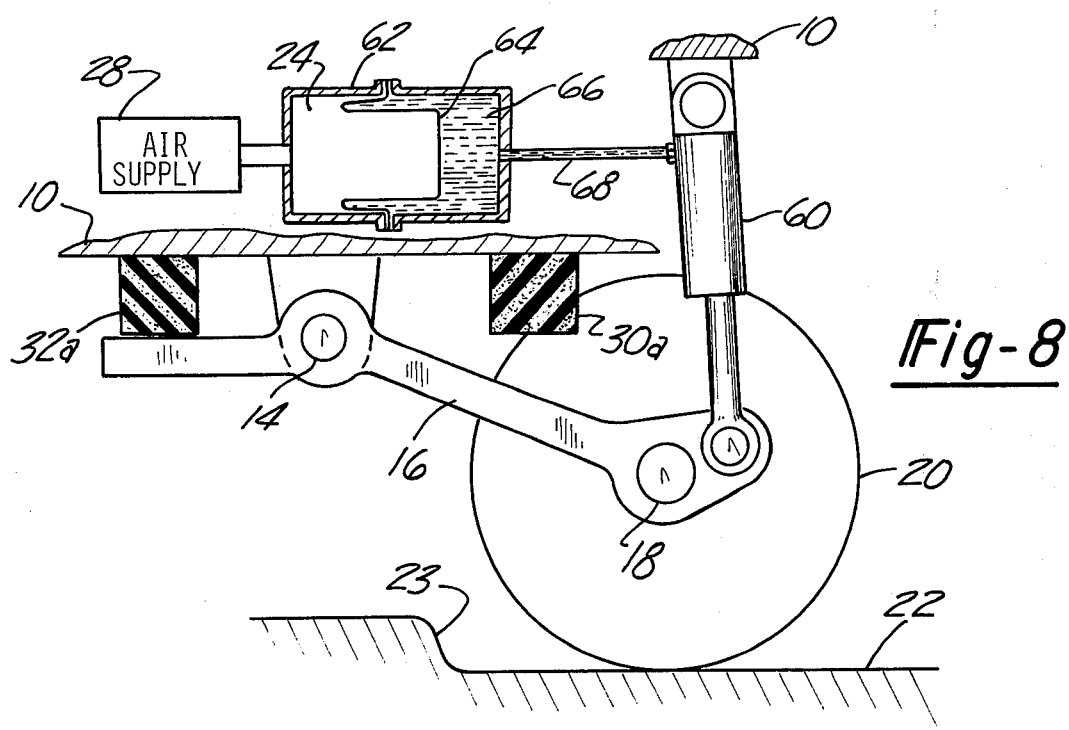

FIG. 7 illustrates another form of the GEM invention embodiment. FIG. 8 illustrates a variation of the invention wherein an air bag is located remote from the wheel.

Figure 1:
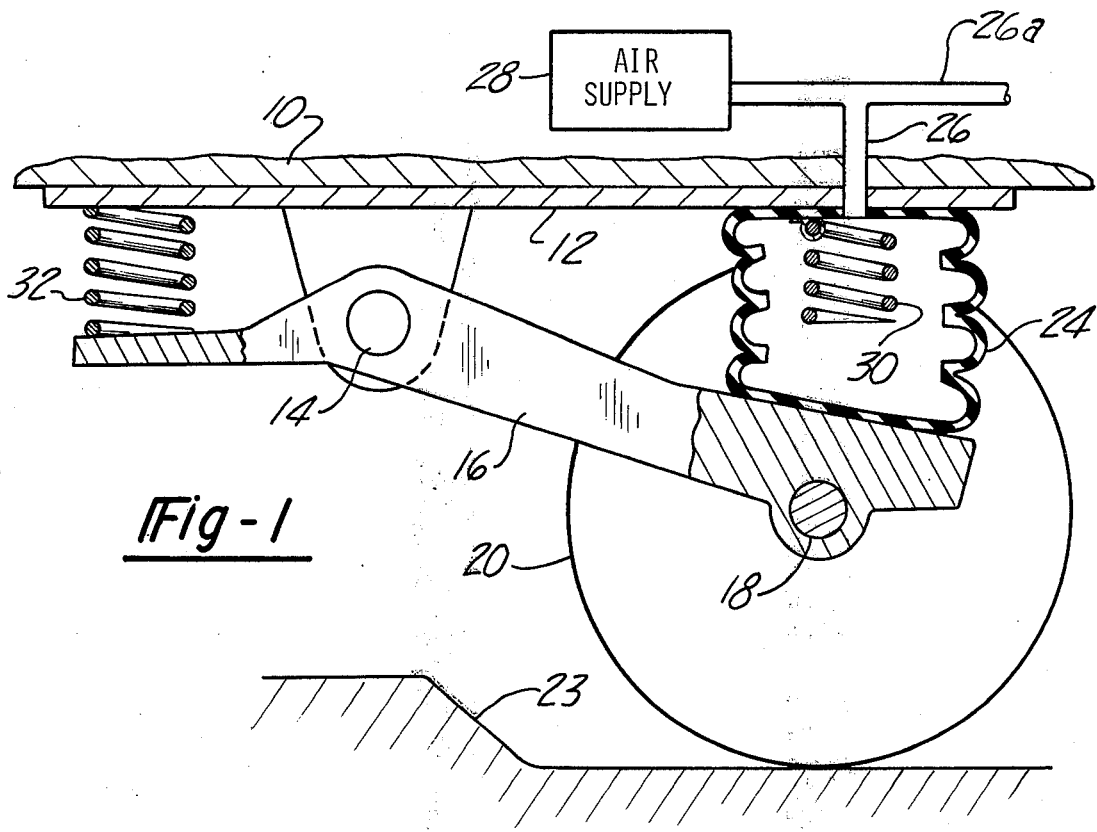
FIGS. 1 and 2 are side elevational views of an Opposing Governing suspension system incorporating the invention and illustrating the so-called normal stroke of the wheel.
Figure 2:
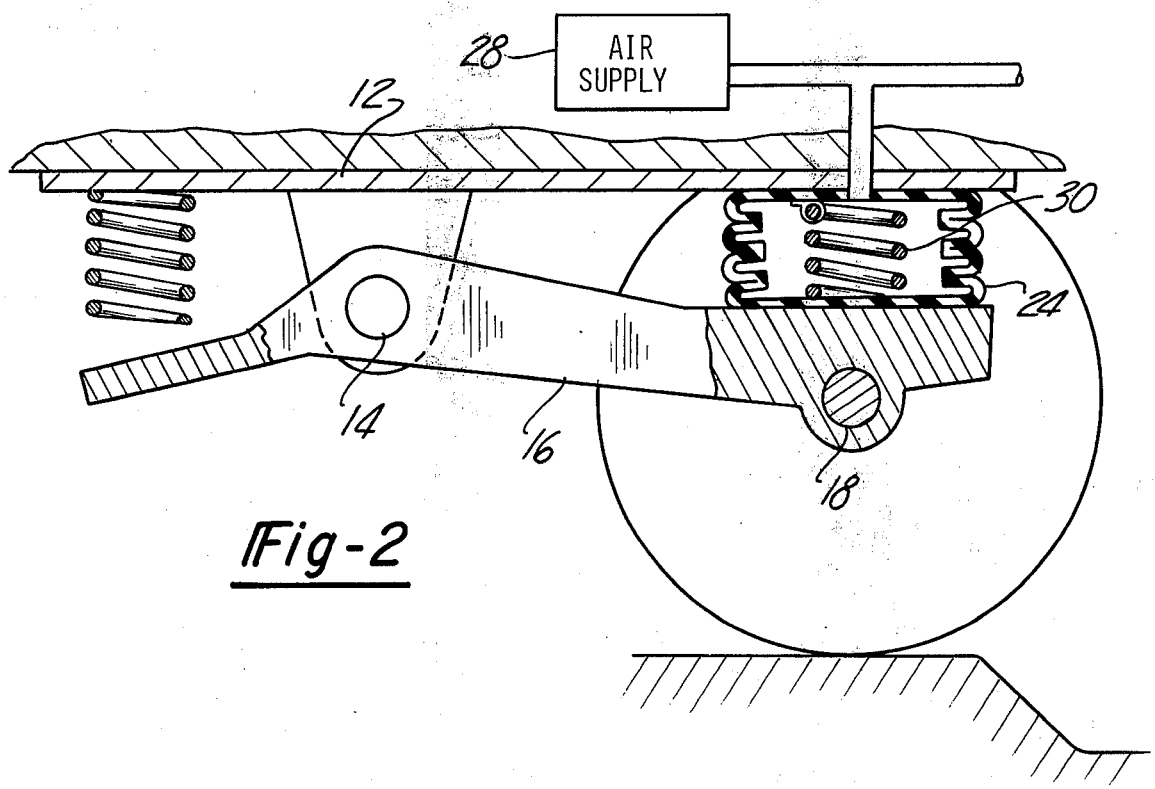

FIGS. 1 and 2

FIG. 1 fragmentarily shows a vehicle sprung mass comprising a frame 10 having a bracket 12 welded or otherwise secured to its undersurface. Bracket 12 provides a pivotal mount 14 for a swingable road arm 16 that carries the spindle 18 for a conventional road wheel 20 designed to roll on the ground surface 22 (or track in the case of a tracked vehicle). Interposed between road arm 16 and frame 10 is an air bag 24 having an air supply line 26 connected to a source of air pressure 28 located within the vehicle. Typically source 28 comprises an air compressor, accumulator, pressure regulator, and pressure switch. The switch is arranged to energize the compressor in response to air usage or leakage, and the regulator is arranged to dump air from the system when the pressure exceeds a certain value; the aim is to provide a substantially constant pressure source 28, e.g. 60 p.s.i. for maintaining a constant pressure in bag 24. The single source 28 is preferably of sufficient capacity to supply air bags at each of the wheels. In FIG. 1 a branch air line 26a is fragmentarily shown leading to one or more of the other wheels. FIG. 1 shows the system with the vehicle in a static at-rest position. The air pressure in the air bag is sufficiently high to force the road arm against an auxiliary governing spring 32 that has a releasable lost-motion connection with the road arm (compare FIGS. 1 and 2). During vehicle movement over relatively moderate obstacles the wheel will be lifted, the road arm will be displaced from the governing spring 32 and solely supported by the air bag with zero spring rate support. Therefore the sprung mass 10 will essentially maintain its attitude, undisturbed by the obstacle. As the obstacle is traversed the air bag 24 will expand forcing the road arm 24 to return toward and against the governing spring 32.

FIGS. 1 and 2 show a second auxiliary compression spring 30 suitably mounted or carried on bracket 12. The auxiliary springs 30 and 32 (FIGS. 1–4) may be of any type, e.g., metal, air springs, rubber, elastomer, etc. During normal operating conditions the auxiliary force mechanism 30 is disengaged from the road arm and thus inactive; the air bag alone absorbs bumps and obstacles. When an unusually large bump obstacle or high vehicle acceleration is encountered the bag may be sufficiently compressed to permit spring 30 to be forcibly engaged by the road arm. Thereafter, continued upward deflection of the wheel by the obstacle causes force means 30 to introduce a progressively increasing additive force to the suspension system. The spring rate of the system is then determined by the air bag and resilient force means 30 so that upward wheel deflection is resiliently retarded at a higher rate; i.e., the system then has a high spring rate.

Compression spring 32 is normally a governing spring for establishing the static vehicle suspension height. However when the road wheel encounters a terrain depression, especially a deep hole, spring 32 introduces a progressively increasing subtractive force into the suspension system. As the air bag extends to maintain the wheel engaged with the surface of the depression the supply source 28 delivers added air to the bag; at the same time spring 32 is compressed to provide a restoration force that becomes effective when the wheel again contacts the ground. Governing spring 32 achieves smooth deceleration of the road wheel as it approaches the lower limit of its permissible deflection stroke, and smooth acceleration of the road wheel as it lifts upwardly from its lowest position.

FIG. 5 depicts a curve 34 that illustrates the general nature of wheel deflection or displacement versus load (suspension force). Position A in FIG. 5 corresponds to the bag-extended condition shown in FIG. 1. Position B in FIG. 5 corresponds to the bag-collapsed condition shown in FIG. 2. Movement between positions A and B (the normal suspension movement) is accomplished by air bag movement; the air bag is the sole suspension device so that obstacles are easily traversed without disturbance to the sprung mass. Movement of the wheel upwardly from position B (to the right in FIG. 5) is against the combined action of the air bag and spring 30; the spring introduces an additive force to the suspension system thus increasing the spring rate to meet high load conditions. The higher load variation capability is required to absorb higher shock forces associated with high speeds, high accelerations or decelerations, and larger size terrain irregularities such as slopes, grades, etc. Movement of the wheel downwardly from position A (to the left in FIG. 5) is achieved by the air bag acting against the governing spring 32. The Δ F shown on the curve represents the preload against the governing spring 32 in the FIG. 1 static position.

A principal advantage of this system is the very high vehicle speed capability provided by constant force (zero rate) support of the sprung vehicle mass during normal individual wheel movement. Other advantages include the incorporation of the booster spring 30 for high shock loads and the inherent capability of air bag springs to meet varying vehicle payload conditions by varying the internal air pressure within the bag (e.g., the same vehicle with and without cargo).

FIGS. 3 and 4 illustrate a second, GEM type, constant force suspension. In this case the same type spring 30 introduces an additive force to the system during upward deflection of the wheel beyond its normal range of positions. However the subtractive force (when the wheel deflects downwardly from its normal positional range) is replaced by means of a progressively openable vent means associated with the air bag. The vent means replaces spring 32 used in the FIG. 1 embodiment for governing the suspension height/position.

As seen in FIGS. 3 and 4 the air bag 24a is provided with an annular exposed edge 42 on its side wall 44. When the bag is largely extended, as in the position of FIG. 3, the exposed edge 42 is spaced a slight distance from the upper surface 26 of road wheel arm 16; accordingly the air within the bag begins to vent through the defined daylight clearance space 48. opened to give a small daylight clearance.

When a normal bump is encountered the air bag will be contracted to the condition of FIG. 4; the bag will function in the same fashion as the closed bag of FIGS. 1 and 2. Overtravel of the road wheel in the up direction will be resisted by the air bag and spring 30 together, as in the FIG. 1 arrangement. When the load is reduced sufficiently, as when the road wheel encounters a deep hole in the terrain, the road arm will separate from the ede 42 of the bag, thereby venting air from the bag interior to the ambient space surrounding the bag. The pressure within the bag will drop, immediately unloading the suspension road arm 16. The unsupported road arm will continue to move down until the downstop 54 is engaged. This is shown as position A on FIG. 6.

When the suspension load is increased, as when the wheel emerges upwardly out of a hole, the daylight clearance will be progressively diminished, thereby decreasing effective bag discharge area and raising the pressure within the air bag for increased load support.

The static governing point is position B on FIG. 6, which corresponds to the condition depicted in FIG. 3, with the air bag fully extended. When a bump or obstacle is encountered, the wheel will move upward, the daylight clearance will close, immediately decreasing air flow and raising the bag pressure a small amount. The degree of pressure increase will be dependent on supply fan and engine control characteristics. As the suspension proceeds further upward the air pressure and supporting force will remain constant until the max travel spring 30 is engaged. The max travel spring is engaged at point C in FIG. 6, which corresponds to the position shown in FIG. 4.

It may be economically desirable or necessary to limit air escape from the bag when the vehicle is static or traversing depressions in the terrain. FIGS. 3 and 4 show a normally-open valve 50 in the air supply line 26. The actuating stem 52 for the valve is arranged to register with road arm 16 so that when the bag separates from road arm surface 46 the stem 52 moves upwardly to close valve 50; as long as the bag is in the daylight clearance mode the closed valve 50 prevents make-up air from reaching the bag. In this way air consumption is reduced. Valve 50 opens and closes gradually; i.e., it is not a snap-action device. When the system is in the bag-closed mode the stem 52 is spaced from road arm 16 so that valve 50 is fully opened for two-directional passage of air between bag 24a and supply source 28.

Movement of road arm 16 is limited by bump stops 54 and 56. The road arm would strike stop 56 only under extreme shock conditions. In most situations spring 30 could effectively increase the spring rate of the system sufficiently to decelerate the road wheel. Bump stop 54 will normally be encountered when the road wheel is not in contact with the ground, e.g. when traversing a hole.

FIG. 7 illustrates an embodiment of the invention that is functionally similar to the FIG. 3 embodiment; the FIG. 7 structure however uses a piston-cylinder type air bag in lieu of the rubberized fabric bag shown in FIG. 3.

The cylinder portion 58 of the bag has a pivotal connection 60 with frame element 12, while the piston portion 59 of the bag has a pivotal connection 62 with road arm 16. Air supply line 26 includes a flexible section 64 suited to withstand slight pivotal movement of the piston-cylinder assembly occasioned by road wheel deflection due to varying load forces. The mechanism is shown in its normal "static" position wherein the air vent slots 48a are just closed by the piston. Upward wheel deflection from the FIG. 7 position produces a slight pressure increase within the cylinder, followed by gradual restoration of the wheel-frame 10 relation in a fashion similar to that described in connection with FIGS. 1 and 3.

Downward deflection of the wheel from the FIG. 7 position opens vent openings 48a in the same fashion as described in connection with FIG. 3. The size and number of slots 28a may be selected in accordance with the desired venting rate, cylinder volume, and air supply capacity of source 28. The system, as shown in FIG. 7, does not include a shut-off valve similar to valve 50 (FIG. 3).

FIG. 8 illustrates a "hydro-pneumatic" embodiment of the invention wherein air bag suspension force is translated into a hydraulic force, which is delivered to each wheel through a liquid piston-cylinder assembly 60. Compressed air from constant pressure source 28 is delivered to a bag-like chamber 24 defined by casing 62 and internal diaphragm 64. Hydraulic fluid in chamber 66 is thereby pumped through flexible line 68 to the single acting piston-cylinder assembly 60, which is trained between the vehicle frame 10 and the road arm 16.

The frame carries two auxiliary springs 30a and 32, shown in the form of elastomeric foam block elements; each spring has a lost motion connection with the road arm. Spring element 32a supplies a negative governing force establishing the static vehicle height, in the fashion of previously described spring 32. Under high load conditions element 30a supplies a progressively increasing additive force to the suspension system, in the fashion of previously described spring 30.

The FIG. 8 system performs in generally the same fashion as the device of FIG. 1. Thus, "up" travel of the wheel from the FIG. 8 position causes hydraulic fluid to be pumped from cylinder 60 toward chamber 66, thereby moving diaphragm 64 against the pressure existing within air bag space 24; this is a constant pressure (zero spring rate) movement because of the character of source 28 and bag space 24. Beyond point B in the cycle (FIG. 5) continued up travel of the wheel causes spring element 30a to introduce a progressively increasing additive force to the system. Down travel of the wheel below point A in the cycle (FIG. 5) causes element 32a to introduce a negative force to the suspension system.

Air space 24 is preferably designed large enough to supply the suspension force for all of the wheels. Each wheel could be equipped with its hydraulic cylinder 60 and hydraulic line 68 leading to a common chamber 66 located remote from the wheel.

In all forms of the invention a substantially constant air pressure source 28 is utilized to supply the individual wheels with a suspension force. In one system a normally inactive force means (32 or 32a) provides a negative pre-load force that opposes the suspension action of the bag 24 under certain conditions. The pre-load force regulates the static vehicle height but is removed or inactive when the wheel is in its normal range of movements traversing terrain bumps or irregularities; the pre-load force also comes into play to cause the vehicle to follow gradual terrain changes.

In the systems of FIGS. 3 and 7 regulation is attained by a vent (42 or 48a) that progressively opens and closes as a function of suspension height. This varies the air pressure and correspondingly the suspension supporting force. The vents are closed, and pressure and force are likewise constant during the normal range of movement traversing terrain bumps and obstacles.

The additive force means 30 or 30a comes into play under high load conditions, as during panic braking or when traversing rapid terrain slope changes. The additive force means at that time supplements the air bag suspension to maintain the desired vehicle attitude relative to the general terrain contour.

When the road wheel is traversing rocks, bumps, etc the suspension force is provided solely by the air bag. Response rate of the system to such disturbances should be relatively high because the bag has a "zero spring rate" operating characteristic. The system is believed to possess a desired operational characteristic wherein the air bag alone quickly responds to rocks, bumps, ruts etc., and wherein the auxiliary force means (32, 48, 32a, 30 or 30a) have a vehicle-stabilizing response to general contour changes or conditions, such as upslopes, downslopes, panic braking or high acceleration.

It will be appreciated that structural variations may be resorted to within the scope of the invention. The invention is believed applicable to many types of vehicles, including passenger vehicles, trucks, buses, trailers and railway type vehicles. It is considered primarily applicable to commercial and military off-road wheeled and tracked vehicles and amphibious vehicles. The invention is also considered applicable to other type systems where constant support of a moving item is needed.

I wish it to be understood that I do not desire to be limited to the exact details of construction shown and described for obvious modifications will occur to a person skilled in the art.

I claim:

1. A vehicle suspension system comprising a source of relatively constant air pressure; an air bag functionally interposed between a road wheel and the vehicle sprung mass to provide a constant suspension force having a zero rate characteristic when the wheel is in a range of intermediate positions representative of normal run conditions; conduit means continually and non-restrictively connecting the bag to the source, whereby the bag internal pressure remains essentially constant throughout the wheel's intermediate positional range; an auxiliary normally inactive force means operable to introduce a progressively increasing additive force to the suspension system only when the wheel is deflected upwardly beyond its intermediate positional range; and a negative governing force means operable to progressively decrease the suspension system net support force only when the wheel is deflected downwardly from its intermediate positional range; the governing force means having a range of values that is sufficient to determine the vehicle suspension height.

2. The system of claim 1 wherein the governing force means comprises a coil spring.

3. The system of claim 1 wherein the governing force means comprises a progressively openable air vent for the bag.

4. The system of claim 3 wherein the air vent is fully closed when the wheel is in its intermediate positional range, said vent being progressively openable in response to downward deflection of the wheel out of its intermediate positional range.

5. The system of claim 4 wherein the vent is formed by a physical separation of the bag side wall from a sealing surface that constitutes one of the bag end walls.

6. The system of claim 1 wherein the governing force means comprises a spring having a lost motion connection with one of said sprung vehicle mass and said road wheel.

7. The system of claim 1 wherein the road wheel is carried on a road arm that is swingably attached to the sprung vehicle mass for movement in a vertical arc; the governing force means being operatively trained between the road arm and the sprung vehicle mass so that the governing force means is effective in the system only when the wheel is at the lower limit of its intermediate positional range.

8. The system of claim 7 wherein each recited force means comprises a spring having a lost motion connection with one of said sprung vehicle mass and said road arm.

9. The system of claim 1 wherein the air bag is operatively connected to the road wheel through a hydraulic force transmitter.

10. The system of claim 9 wherein the hydraulic forcetransmitter includes a piston-cylinder means trained between the sprung mass and the wheel.

* * * * *